A. R. PRITCHARD.
HANDLE FOR COAL HODS AND THE LIKE.
APPLICATION FILED FEB. 9, 1912.

1,048,733.

Patented Dec. 31, 1912.

Witnesses:
Clarence W. Carroll
L. Thon

Inventor:
Albert R. Pritchard
by his attorneys
Osgood, Davis & Dorsey

UNITED STATES PATENT OFFICE.

ALBERT R. PRITCHARD, OF ROCHESTER, NEW YORK, ASSIGNOR OF ONE-HALF TO THE LISK MANUFACTURING COMPANY, LIMITED, OF CANANDAIGUA, NEW YORK, A CORPORATION, AND ONE-HALF TO PRITCHARD STAMPING COMPANY, OF ROCHESTER, NEW YORK, A CORPORATION OF NEW YORK.

HANDLE FOR COAL-HODS AND THE LIKE.

1,048,733.   Specification of Letters Patent.   Patented Dec. 31, 1912.

Application filed February 9, 1912. Serial No. 676,675.

*To all whom it may concern:*

Be it known that I, ALBERT R. PRITCHARD, a citizen of the United States, and resident of Rochester, in the county of Monroe and State of New York, have invented certain new and useful Improvements in Handles for Coal-Hods and the Like, of which the following is a specification.

This invention relates to handles, of the bail type, for use in connection with coal-hods, buckets, or similar vessels.

The object of the invention is to produce a handle which will permit the vessel to be freely tilted to discharge its contents, the handle being so constructed, however, that when not in use it remains in upright position, so as to be conveniently grasped. To this end I employ a novel and simple construction by which the handle is retained in raised position without recourse to resilient means for this purpose, the ends or eyes of the bail-shaped handle, and the lugs or ears by which they are connected with the body of the coal-hod, or other vessel, being so constructed that the handle is automatically locked and retained in upright position by the action of its own weight when released by the user.

The invention is more particularly described as embodied in the construction illustrated in the accompanying drawings, in which—

Figure 1:
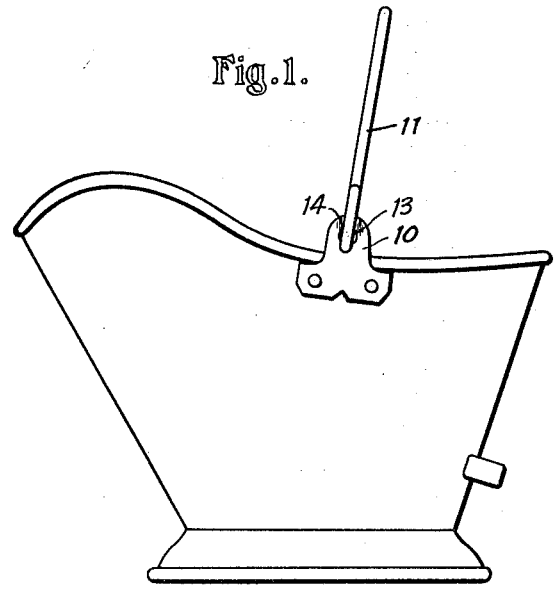
Figure 2:
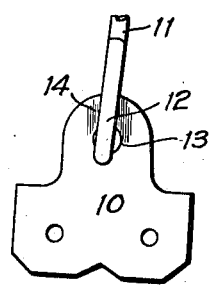
Figure 3:
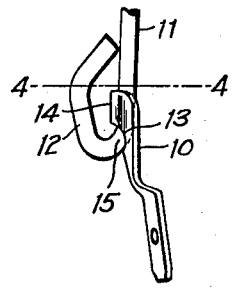
Figure 4:
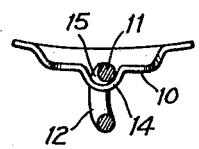
Figure 5:
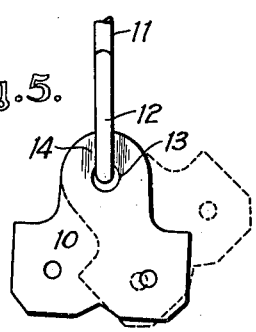
Figure 6:
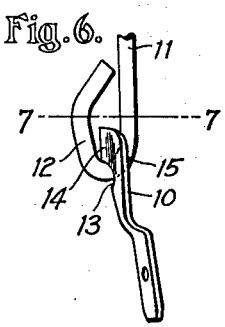
Figure 7:
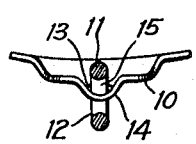

Figure 1 is a side-elevation of a coal-hod provided with a handle embodying the invention, the handle being in its normal position; Fig. 2 is a side-elevation, on a larger scale, of a portion of the handle, including one of the ears and the coöperating extremity of the bail; Fig. 3 is an elevation of the same parts, seen from the right of Fig. 2; Fig. 4 is a plan-view, in section on the line 4—4 in Fig. 3; and Figs. 5, 6 and 7 are views similar to Figs. 2, 3 and 4, except that they show the parts in the position assumed when the handle is in use to support the coal-hod.

In the illustrated embodiment of the invention sheet-metal ears 10 are secured in the usual manner to the sides of the coal-hod adjacent the upper edge thereof, and these ears are perforated to receive the ends of the bail 11. Each end of the bail is bent to form an eye 12, which engages the perforation 13 in the corresponding ear. Just above this perforation the sheet-metal of the ear is bent outwardly or offset at 14, to form a vertical recess which overhangs and is vertically in line with the perforation 13. The bail 11, at the lower inner part of the eye 12, has an outwardly-inclined portion 15, as shown particularly in Figs. 3 and 6. When the handle is in use to support the vessel the eye is drawn upwardly so as to engage the upper part of the perforation, as shown in Figs. 5, 6 and 7, and in this position of the parts the body of the vessel may be swung freely to discharge its contents, the ears being free to move pivotally upon the eyes 12 of the bail. When the vessel is set down upon a horizontal surface, however, the bail being at this time in a vertical position, and being released in this position by the user, descends into the position of Figs. 2, 3 and 4, the inclined portion 15 sliding downwardly and outwardly in the perforation and thus permitting or forcing the end of the bail to move outwardly and into the recessed portion 14 of the ear. Through the engagement of the inclined portion 15 with the ear the bail is wedged in this position, so that it cannot move pivotally in the ear, and accordingly the handle is retained positively in upright position.

Although only one of the ears 10 is illustrated in the drawings, it will be understood that a pair of ears are employed in the usual manner. In the most complete embodiment of the invention both ears and both ends of the bail are of similar construction, so as to provide a double lock for the handle, but this arrangement is not essential, as it is sufficient to employ the novel construction above described in one ear and the corresponding end of the bail, in order to produce the locking action described.

It will be understood that in the claim where I have described the relative position of the parts by the terms "inner" and "outwardly" these terms are employed merely for convenience in describing such relative position, and that the device would operate in a substantially similar manner provided these relative positions were reversed, and it is not, therefore, intended to limit the claim in this respect.

I claim:—

A handle, for coal-hods and the like, comprising an ear having a perforation, and a recess, on its inner surface, extending from the perforation to the upper edge of the ear; and a bail having an eye pivoted in the perforation of the ear, the inner, lower portion of the ear being outwardly and downwardly inclined so as to force the eye, under the influence of the weight of the bail, outwardly into locking engagement with the recess.

ALBERT R. PRITCHARD.

Witnesses:
D. GURNEE,
L. THON.